(12) United States Patent
Horie et al.

(10) Patent No.: US 10,846,217 B1
(45) Date of Patent: Nov. 24, 2020

(54) GARBAGE COLLECTION WORK STEALING WITH MULTIPLE-TASK POPPING

(71) Applicant: INTERNATIONAL BUSINESS MACHINES CORPORATION, Armonk, NY (US)

(72) Inventors: Michihiro Horie, Saitama (JP); Kazunori Ogata, Tokyo (JP); Mikio Takeuchi, Kanagawa (JP); Hiroshi Horii, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/405,080

(22) Filed: May 7, 2019

(51) Int. Cl.
*G06F 12/00* (2006.01)
*G06F 12/02* (2006.01)
*G06F 9/48* (2006.01)

(52) U.S. Cl.
CPC ........ *G06F 12/0253* (2013.01); *G06F 9/4881* (2013.01); *G06F 2212/1044* (2013.01)

(58) Field of Classification Search
CPC .............. G06F 12/0253; G06F 9/4881; G06F 2212/1044
See application file for complete search history.

(56) References Cited

U.S. PATENT DOCUMENTS

| | | | | |
|---|---|---|---|---|
| 7,640,544 B2* | 12/2009 | Flood | .................. | G06F 12/0276 707/999.202 |
| 9,038,087 B2 | 5/2015 | Ringseth et al. | | |
| 9,317,339 B2 | 4/2016 | Lev et al. | | |
| 2003/0005025 A1* | 1/2003 | Shavit | ................... | G06F 9/4843 718/102 |
| 2004/0088702 A1* | 5/2004 | Garthwaite | ......... | G06F 12/0276 718/100 |
| 2009/0320027 A1* | 12/2009 | Ringseth | ................ | G06F 9/522 718/102 |
| 2012/0254267 A1* | 10/2012 | Printezis | ............. | G06F 12/0269 707/818 |
| 2018/0314631 A1* | 11/2018 | Horie | .................... | G06F 9/4843 |
| 2018/0314633 A1* | 11/2018 | Horie | .................... | G06F 9/4843 |
| 2020/0005734 A1* | 1/2020 | Koker | ................. | G06F 12/0828 |

OTHER PUBLICATIONS

Nimar S. Arora et al., "Thread Scheduling for Multiprogrammed Multiprocessors", Proceedings of the Tenth Annual ACM Symposium on Parallel Algorithms and Architectures (SPAA), Puerto Vallarta, Mexico, Jun. 1998.
Changhui Lin et al., "Fence Scoping", SC14, New Orleans, Louisiana, Nov. 16-21, 2014.
Danny Hendler et al., "Non-Blocking Steal-Half Work Queues", PODC, Monterey, California, Jul. 21-24, 2002.

* cited by examiner

*Primary Examiner* — John A Lane
(74) *Attorney, Agent, or Firm* — Tutunjian & Bitetto, P.C.; Vazken Alexanian (57) ABSTRACT

Methods and systems for performing garbage collection include issuing a memory fence that indicates that a number of tasks in a garbage collection deque, belonging to a first garbage collection thread, has decreased by more than one. A length of the garbage collection deque, after the memory fence is issued, is determined to be greater than zero. Multiple tasks are popped from the garbage collection deque responsive to the determination that the length of the garbage collection deque is greater than zero. Garbage collection is performed on the popped tasks.

19 Claims, 5 Drawing Sheets

GARBAGE COLLECTION WORK STEALING WITH MULTIPLE-TASK POPPING

BACKGROUND

The present invention generally relates to garbage collection in computing systems and, more particularly, to taking multiple tasks from garbage collection queues to reduce overhead from memory fences.

Garbage collection in multi-threaded systems can be performed using multiple garbage collection threads, each having a respective double-ended queue (hereinafter "deque") that stores a set of garbage collection tasks. When a garbage collection thread finishes the last task in its deque, it can seek to take tasks from other deques belonging to other garbage collection threads. This promotes load balancing and prevents idleness.

However, this work stealing operation has the potential to cause conflicts if the garbage collection thread seeks to take a task that another garbage collection thread has claimed. In some embodiments, a compare-and-swap operation can be used to guarantee consistency in the deques. However, using compare-and-swap for every operation is excessive. Some garbage collection systems therefore use memory fences to manage the accessibility of particular tasks within the deques.

SUMMARY

A method for performing memory garbage collection includes issuing a memory fence that indicates that a number of tasks in a garbage collection deque, belonging to a first garbage collection thread, has decreased by more than one. A length of the garbage collection deque, after the memory fence is issued, is determined to be greater than zero. Multiple tasks are popped from the garbage collection deque responsive to the determination that the length of the garbage collection deque is greater than zero. Garbage collection is performed on the popped tasks.

A method for performing memory garbage collection includes issuing a first memory fence that indicates that a first number of tasks in a garbage collection deque, belonging to a first garbage collection thread, has decreased by an original number N that is greater than one. A length of the garbage collection deque, after the memory fence is issued, is determined to be less than or equal to zero. A new value for N is determined based on an updated number of tasks in the deque responsive to determining that the length of the garbage collection deque is less than or equal to zero. A second memory fence is issued that indicates a second number of tasks in the garbage collection deque has decreased by the new value for N. The N tasks are popped from the garbage collection deque after the second memory fence is issued. Garbage collection is performed on the popped tasks A garbage collection system includes a first garbage collection thread, executed by a processor device, that has an associated first garbage collection deque. The first garbage collection thread is configured to issue a memory fence that indicates that a first number of tasks in the first garbage collection deque has decreased by a number N that is greater than one; to determine whether a length of the first garbage collection deque, after the memory fence is issued, is less than or equal to zero; to pop multiple tasks from the garbage collection deque if the length of the garbage collection deque is greater than zero; to abort a pop operation if the length of the garbage collection deque is less than zero; and to perform garbage collection on any popped tasks.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention reduce the use of memory fences by allowing garbage collection threads to multiple pop tasks at once from their own deques. Rather than using a static granularity, which can decrease parallelism by preemptively exhausting a deque when other garbage collection threads could take some of the work, the present embodiments adjust the number of tasks that are taken at a time to maximize load balancing.

The term "garbage collection" in the field of computer science refers to managing memory use by programs in an automatic fashion. A garbage collection thread is a process that identifies and deallocates memory that is no longer needed by a program. This contrasts to systems in which a programmer manually deallocates memory, which is a time-consuming and error-prone practice. However, garbage collection can be resource-intensive for the computer system. Thus, in multi-threaded systems, for example systems with multiple processors or processor cores, parallelism in garbage collection provides significant benefits.

Load balancing between garbage collection threads can be a challenge. In some circumstances, one thread will exhaust its work, while another thread may have a backlog. To address this, garbage collection threads can practice "work stealing," whereby a garbage collection thread without work can take work from another thread.

Figure 1:
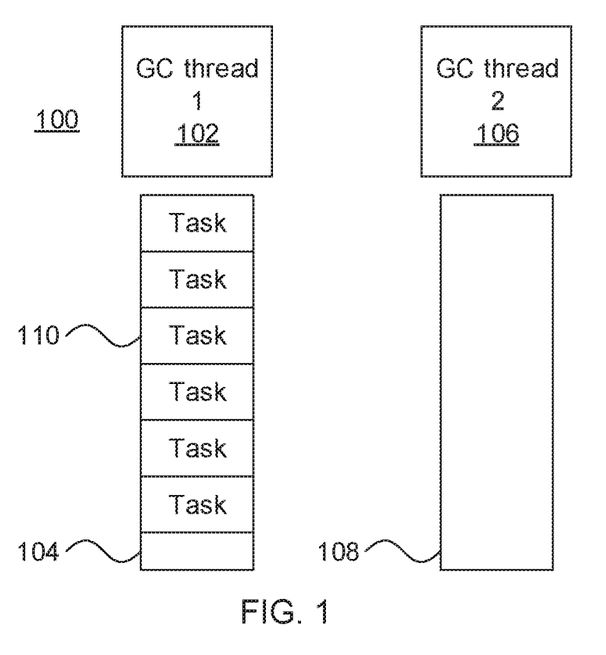
FIG. 1 is a diagram of work-stealing memory garbage collection threads where an owner thread can pop multiple tasks at a time without conflicting with other garbage collection threads in accordance with an embodiment of the present invention.

Referring now to FIG. 1, a diagram of an exemplary garbage collection system 100 is shown. A first garbage collection 102 is shown with its double-ended queue (hereinafter "deque") 104, from which tasks 110 can be popped from either the top or the bottom. Each first garbage collection thread pops one or more tasks 110 from the top of its deque for processing.

A second garbage collection thread 106 is also shown and has a corresponding deque 108. The second deque 108, however, is empty. In this case, the second garbage collection thread 106 will attempt to take work from another deque (e.g., the deque 104 of the first garbage collection thread 102). When a garbage collection thread takes work from the deque of another thread, it pops a single task from the bottom of that deque.

In general, when a garbage collection thread 102 pops one or more tasks 110 from its own deque 104, it issues a memory fence. A memory fence is an instruction that enforces an ordering constraint, where operations that were issued before the memory fence are completed before operations that are issued after the memory fence. Using memory fences is important for maintaining consistency, particularly in multi-threaded environments. However, memory fences also impose a performance penalty, as they diminish the system's ability to optimize operations.

To decrease the number of memory fences that are issued by a garbage collection thread 102, the garbage collection thread 102 can pop multiple tasks 110 from its deque 104 at a time. Thus the garbage collection thread 102 will work for a longer period of time before it completes it needs to pop more tasks 110 and issue another memory fence. A consequence of this, however, is that a second garbage collection thread 106 that attempts to take a task 110 from the first garbage collection thread 102 can be deprived of work, reducing the efficiency of the system.

The present embodiments therefore give priority to the second garbage collection thread 106. If the first garbage collection thread 102 reserves a set of N tasks 110, and the second garbage collection thread 106 attempts to take one of those tasks 110, the first garbage collection thread 102 releases its reservation so that the second garbage collection thread 106 can take the task. The number of tasks which the first garbage collection thread 102 takes at a time depends on the number of tasks 110 in the respective deque 104.

Figure 2:
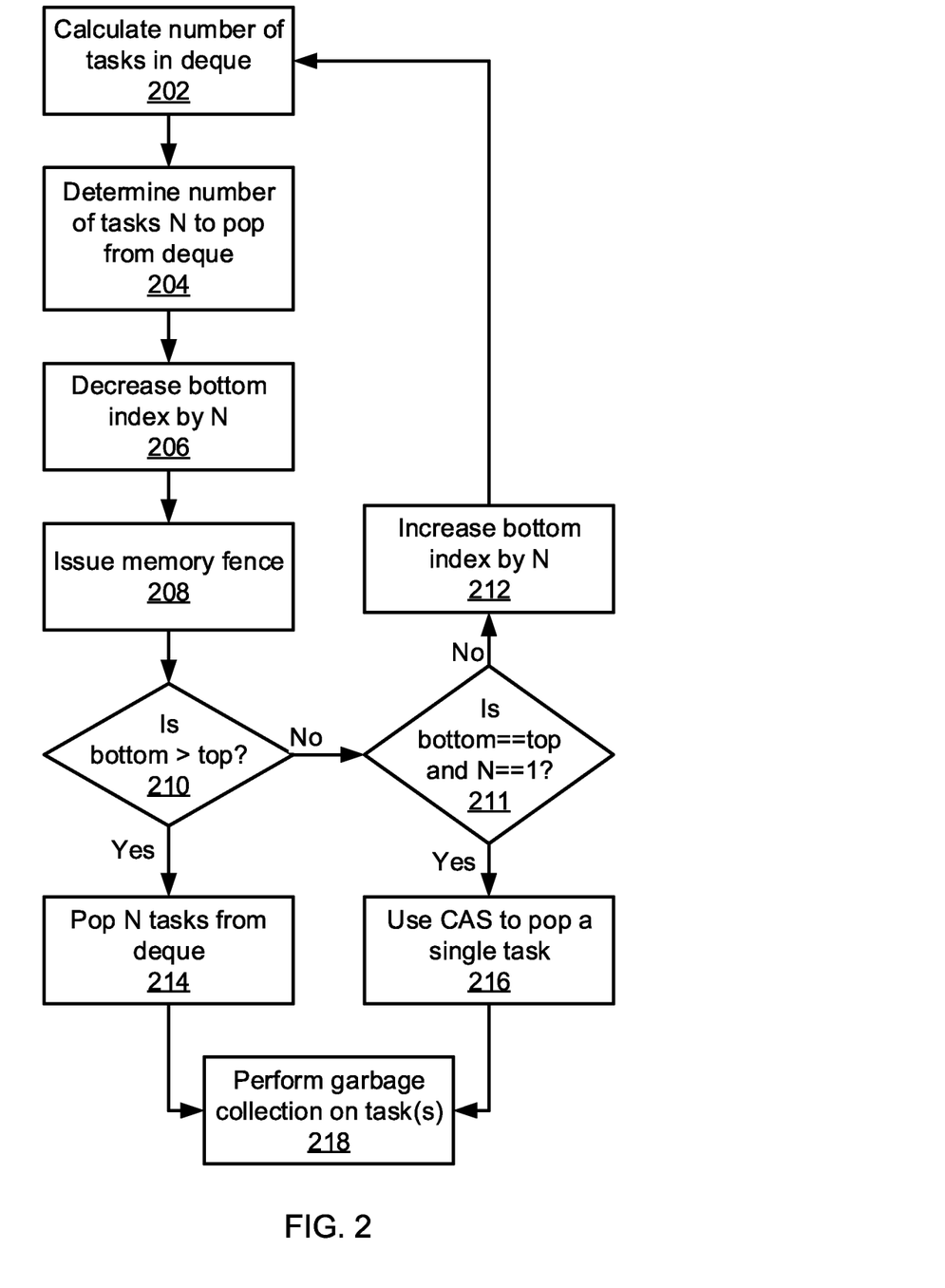
FIG. 2 is a block/flow diagram of a method for popping multiple tasks at a time by an owner thread without conflicting with other garbage collection threads in accordance with an embodiment of the present invention.

Referring now to FIG. 2, a method for popping multiple tasks from a deque 104 by the owner thread 102 is shown. Block 202 determines the number of tasks 110 in the deque 104. In one example, this can be performed by subtracting an value of an index for the "top" of the deque from a value of an index for the "bottom" of the deque, but it should be understood that any method may be used to determine the number of tasks, such as a list traversal.

Block 204 then determines the number N of tasks 110 to pop from the deque 104, based on the number of tasks in the deque 104. The value N can be determined with a runtime configuration based on, e.g., how many garbage collection threads are running and how many child tasks are created per task process on average. In one example, if the number of remaining tasks in the deque 104 is greater than a threshold value, the owner thread 102 takes multiple tasks at a time, and if the number of tasks is below the threshold value, the owner thread 102 takes a single task at a time.

In an example where there are many garbage collection threads 106 with empty deques 108, and thus many garbage collection threads 106 seeking to take work from the deque 104, then the owner garbage collection thread 104 pops fewer tasks at a time, based on the number of other garbage collection threads 106. In such an example, the owner thread 102 might pop N tasks at a time if there are at least 2N tasks in its deque 104. In an example with more fine-grained conditions, if the remaining tasks are greater than 4N, the owner thread could take 2N tasks, if the tasks are less than 4N but greater than 3N, then the owner can take 1.5N tasks at a time. Any appropriate rules and conditions for determining how many tasks to take can be used.

Block 206 decreases the value of the bottom index by N to reflect the decreased size of the deque 104 after N tasks have been taken from it. Block 208 issues a memory fence to advertise the new deque size. At this time the data at the top of the queue can be read out.

Block 210 determines whether the decreased bottom index value is greater than the top index value. In other words, block 210 checks to see whether any tasks 110 would remain in the deque 104 after popping N tasks. If so, block 214 causes the owner thread 102 to pop N tasks from the queue for processing.

If the result of block 210 is that the bottom index value is equal to or less than the top index value, then removing N tasks would remove all of the tasks 110 from the deque 104. Block 211 then determines whether the adjusted bottom index value is exactly equal to the top value—in other words, whether exactly N tasks remain in the queue—and whether N equals one. If so, then block 216 uses a compare-and-swap process to pop a single task (the last task) from the deque 104. Compare-and-swap is used to prevent contention if another thread also attempts to take the last task 110. Once one or more tasks have been popped from the deque 104 in either block 214 or 216, block 218 performs garbage collection on the popped task(s), deallocating any memory associated with the task(s).

If block 211 finds that the adjusted bottom index value is less than the top index value and/or that N is some value other than one, block 212 increases the bottom index value by N and processing returns to block 202. In other words, block 212 reverts the change to the length of the queue and aborts the attempt to pop N tasks from the thread. This can occur because one or more garbage collection threads 106 have taken tasks 110 from the deque 104, changing the length of the deque 104 between the time the number of tasks 110 was calculated in block 202 and the issuance of the memory fence in block 208. The owner thread 104 therefore recalculates the number of tasks 110 in the deque 104 and attempts to pop a revised number N of tasks 110.

In this manner, the present embodiments avoid using compare-and-swap for every pop operation, which usually is not needed, and also reduces the number of memory fences by decreasing the number of times that the owner thread 104 will have to issue when there are ample tasks 110 in the deque 104. Thus the owner thread issues a memory fence, even if it does not ultimately pop the N threads. While this incurs a nominal performance penalty, it is more than made up for by the successful removal of N tasks at other times.

Figure 3:
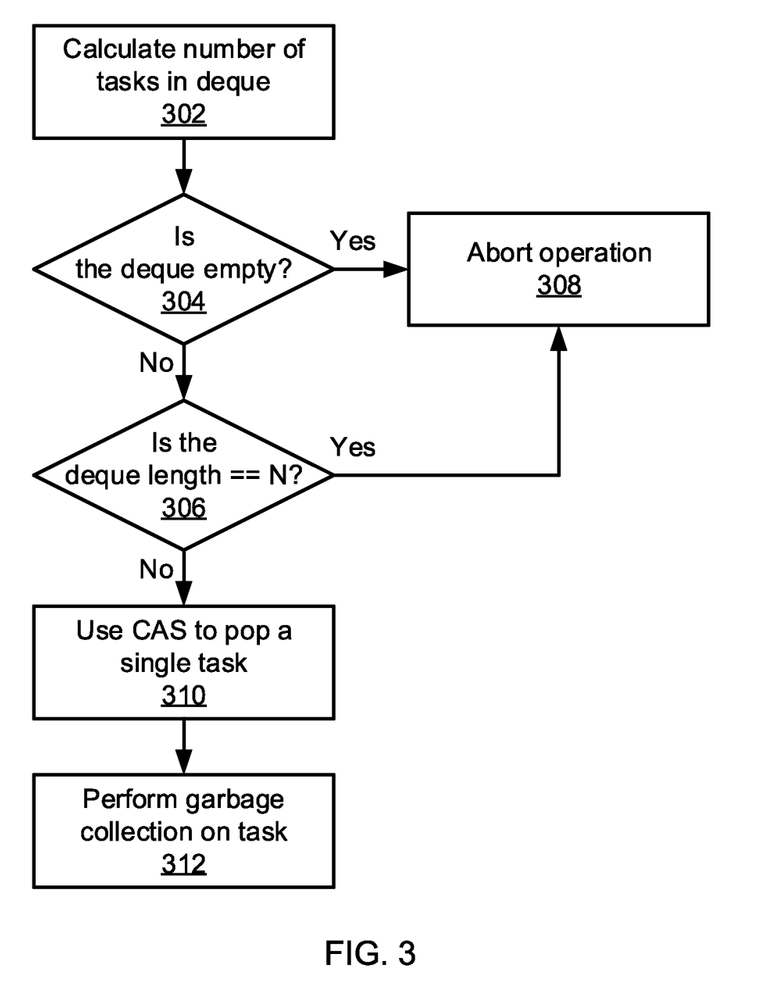
FIG. 3 is a block/flow diagram of a method for popping a task from another garbage collection thread's deque that is sensitive to a number of tasks being popped by the owner in accordance with an embodiment of the present invention.

Referring now to FIG. 3, a method for popping multiple tasks from a deque 104 by a different garbage collection thread 106 having an empty queue 108 is shown. Block 302 calculates the number of tasks 110 in the deque 104. As above, this calculation can be performed by subtracting the top index value from the bottom index value.

Block 304 determines whether the deque 104 is empty (i.e., whether the calculated number of tasks is zero) and block 306 determines whether the deque 104 has exactly N tasks remaining, based on a determination of the value N by the owner thread 102. In either case, block 308 aborts the pop operation, because all of the tasks in the deque 104 have been accounted for. If the deque 104 has a number of tasks 110 that is not zero and is not N, block 310 uses compareand-swap to pop a single task 110 from the deque 104. Block 312 then performs garbage collection on the popped task.

This process will at most reduce the number of tasks in the deque 104 to N. In that event, if the owner thread 102 attempts to pop N tasks, blocks 210 and 211 of the owner thread pop process will often abort taking N tasks and recalculate. This prevents the owner thread 102 from taking all of the work in its deque 104, unless only a single tasks remains, allowing other garbage collection threads 106 to take work and improve load balancing.

Thus, when a garbage collection thread 106 attempts to take work from an owner thread 102, it can encounter one of three situations. First, it can find the bottom index value before it has been adjusted by the owner thread 102. Second, it can find the bottom index value after it has been adjusted by the owner thread 102. Third, it can find that the bottom index value has been reverted due to a conflict in taking tasks. The garbage collection thread 106 can take a task in the first and third circumstances if the top index value is less than the bottom index value. The garbage collection thread 106 can take a task in the second circumstance if the difference between the top and bottom index values is less than N.

The present embodiments were tested across a set of five different garbage-collection-intensive benchmarks, including compiler.compiler, compiler.sunflow, xml.transform, xml.validation, and sunflow. In a test where the number N of tasks to pop at a time was set to 8, the benchmark scores for the present embodiments increased by an average of 6%, with one benchmark showing an improvement of 13%. Garbage collection pause time was reduced by an average of 13%, showing an improvement in load balancing as the garbage collection threads were kept busy. Processor utilization for popping tasks was reduced by an average of 76%, representing the reduction in the overhead that resulted from issuing fewer memory fences.

It is evident that the present embodiments therefore provide a substantial improvement to computing technologies. Because of the prevalence of garbage collection systems in modern computing environments, an improvement to garbage collection efficiency provides an improvement to the overall functioning of the computer and the applications that run on it.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
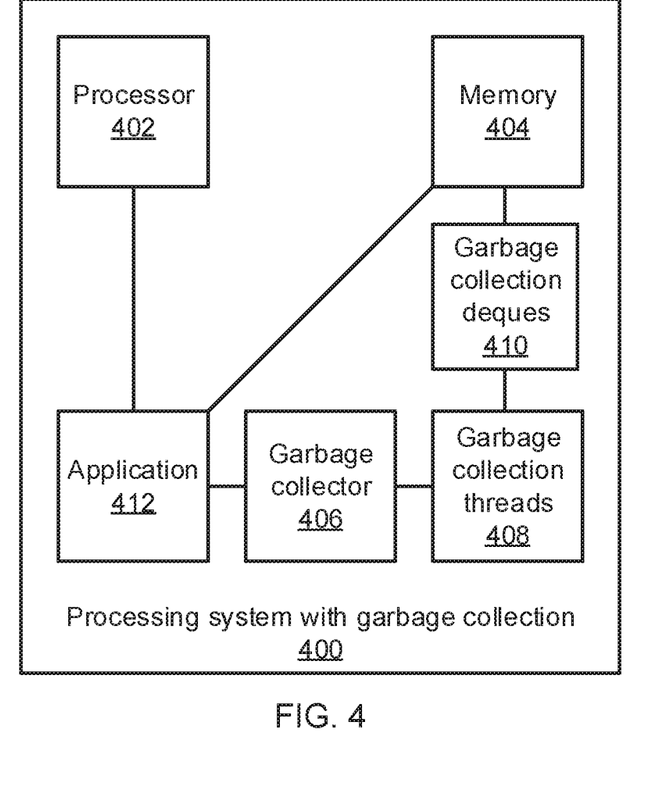
FIG. 4 is a block diagram of a processing system that implements efficient memory garbage collection by having threads pop multiple tasks at a time from their own deques without interfering with work-stealing by other threads in accordance with an embodiment of the present invention.

Referring now to FIG. 4, a processing system 400 with efficient garbage collection is shown. The processing system 400 includes a hardware processor 402 and a memory 404. It is specifically contemplated that the hardware processor 402 can implement a multi-threaded processing environment, for example using multiple processor cores or by any other appropriate means.

The processor executes a software application 412 that is stored in memory 404 and that allocates portions of the memory 404 for its operations. When the software application 412 is finished with a particular memory allocation, a garbage collector 406 identifies the obsolete memory and assigns it as a task 110 in a deque 104 of a garbage collection thread 102. The garbage collector 406 can manage multiple garbage collection threads 408 in this fashion, distributing the work to the garbage collection deques 410 of respective garbage collection threads 408, with the number of garbage collection threads 408 and deques 410 being determined in any appropriate fashion in view of the hardware being used.

Each of the garbage collection threads 408 attempts to pop multiple tasks 110 from their respective garbage collection deques 410 if there are sufficient tasks available. The garbage collection threads 408 make a determination of how many tasks to take at a time, but defer to other garbage collection threads 408 when they attempt to take work. As noted above, when a particular garbage collection thread 106 empties its respective deque 108, it attempts to take work from another garbage collection thread 104 that still has tasks 110 in its own deque 104. By deferring to the other garbage collection thread 106, the owner thread 102 preserves load balancing and ensures that it will not be processing tasks that could have been handled by other threads.

Figure 5:
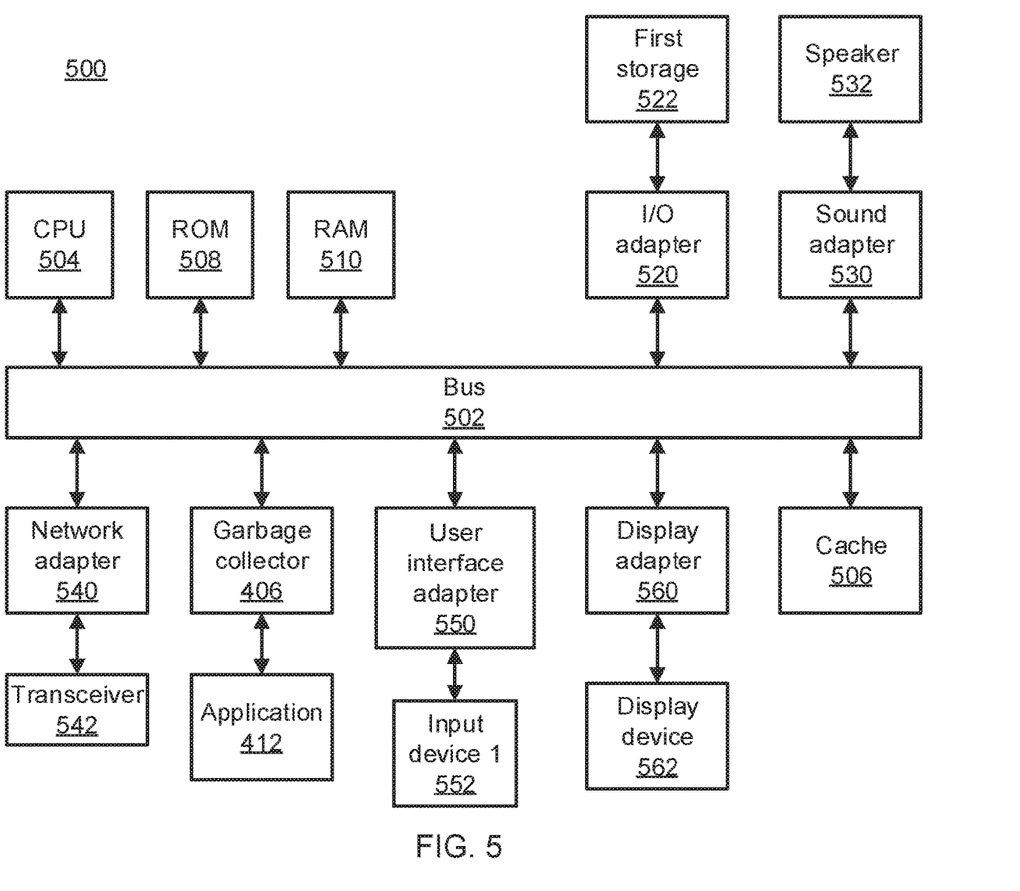
FIG. 5 is a block diagram of a processing system that implements efficient memory garbage collection by having threads pop multiple tasks at a time from their own deques without interfering with work-stealing by other threads in accordance with an embodiment of the present invention.

Referring now to FIG. 5, an exemplary processing system 500 is shown which may represent the processing system 400 with garbage collection. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 is operatively coupled to system bus 502 by the I/O adapter 520. The storage device 522 can be any of a disk storage device (e.g., a magnetic or optical disk storage device), a solid state magnetic device, and so forth.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552 is operatively coupled to system bus 502 by user interface adapter 550. The user input device 552 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input device 552 can be the same type of user input device or different types of user input devices. The user input device 552 is used to input and output information to and from system 500.

The processing system 500 further includes a garbage collector 406 that interfaces with one or more applications 412 to manage the deallocation of memory that was allocated by an application 412 and is no longer needed.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Having described preferred embodiments of garbage collection work stealing with multiple-task popping (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for performing memory garbage collection, comprising:
    issuing a memory fence that indicates that a number of tasks in a garbage collection deque, belonging to a first garbage collection thread, has decreased by more than one;
    determining that a length of the garbage collection deque, after the memory fence is issued, is greater than zero;
    popping multiple tasks from the garbage collection deque responsive to the determination that the length of the garbage collection deque is greater than zero; and
    performing garbage collection on the popped tasks.

2. The method of claim 1, further comprising determining a number N of garbage collection tasks to pop based on a length of the garbage collection deque, wherein popping multiple tasks pops N tasks.

3. The method of claim 2, wherein issuing the memory fence comprises indicating that the length of the garbage collection deque has decreased by N.

4. The method of claim 1, further comprising determining a number N of garbage collection tasks to pop based on a number of garbage collection threads, wherein popping multiple tasks pops N tasks.

5. The method of claim 4, wherein determining the number N comprises assigning lower values to N when higher numbers of garbage collection threads are available.

6. A method for performing memory garbage collection, comprising:
    issuing a first memory fence that indicates that a first number of tasks in a garbage collection deque, belonging to a first garbage collection thread, has decreased by an original number N that is greater than one;
    determining that a length of the garbage collection deque, after the memory fence is issued, is less than or equal to zero;
    determining a new value for N based on an updated number of tasks in the deque responsive to determining that the length of the garbage collection deque is less than or equal to zero;
    issuing a second memory fence that indicates a second number of tasks in the garbage collection deque has decreased by the new value for N;
    popping the new value of N tasks from the garbage collection deque after the second memory fence is issued; and
    performing garbage collection on the popped tasks.

7. The method of claim 6, further comprising determining the original number N of garbage collection tasks to pop based on a length of the garbage collection deque.

8. The method of claim 7, wherein issuing the first memory fence comprises indicating that the length of the garbage collection deque has decreased by the original number N.

9. The method of claim 6, further comprising determining a number N of garbage collection tasks to pop based on a number of garbage collection threads.

10. The method of claim 9, wherein determining the number N comprises assigning lower values to N when higher numbers of garbage collection threads are available.

11. A memory garbage collection system, comprising:
    a first garbage collection thread, executed by a processor device, that has an associated first garbage collection deque, wherein the first garbage collection thread is configured to issue a memory fence that indicates that a first number of tasks in the first garbage collection deque has decreased by a number N that is greater than one; to determine whether a length of the first garbage collection deque, after the memory fence is issued, is less than or equal to zero; to pop multiple tasks from the garbage collection deque if the length of the garbage collection deque is greater than zero; to abort a pop operation if the length of the garbage collection deque is less than zero; and to perform garbage collection on any popped tasks.

12. The system of claim 11, wherein the first garbage collection thread is further configured to determine a number N of garbage collection tasks to pop based on a length of the garbage collection deque.

13. The system of claim 12, wherein the first garbage collection thread is further configured to issue the fence indicating that the length of the garbage collection deque has decreased by N.

14. The system of claim 11, wherein the first garbage collection thread is further configured to determine a new number of tasks to pop based on an updated number of tasks in the deque responsive to determining that the length of the first garbage collection deque is less than or equal to zero.

15. The system of claim 14, wherein the first garbage collection thread is further configured to determine a number N of garbage collection tasks to pop based on a number of garbage collection threads.

16. The system of claim 11, wherein the first garbage collection thread is further configured to determining the number N by assigning lower values to N when higher numbers of garbage collection threads are available.

17. The system of claim 11, further comprising a second garbage collection thread configured to pop a task from a bottom of the first garbage collection deque.

18. The system of claim 11, wherein the second garbage collection thread is further configured to determine whether the deque length is equal to N.

19. The system of claim 18, wherein the second garbage collection thread aborts popping the task from the bottom of the first garbage collection deque if the deque length is equal to N.

* * * * *